L. FARGUE.
FOUNTAIN-PEN.

No. 191,950. Patented June 12, 1877.

UNITED STATES PATENT OFFICE.

LÉON FARGUE, OF PARIS, FRANCE.

IMPROVEMENT IN FOUNTAIN-PENS.

Specification forming part of Letters Patent No. 191,950, dated June 12, 1877; application filed February 27, 1877; patented in France, August 31, 1876, for 15 years.

*To all whom it may concern:*

Be it known that I, LÉON FARGUE, of Paris, France, have invented a new and Improved Solid-Ink Supply Pen; and I do hereby declare that the following is a full, clear, and exact description of the same, reference being had to the accompanying drawing, forming part of this specification, in which—

Figure 1:
Figure 2:

Figure 1 is an enlarged longitudinal section of a pen embodying my invention. Fig. 2 is a rear view.

My invention relates to that class of writing-pens in which a quantity of solidified ink is applied to the pen to make it self-supplying when dipped from time to time into water, in contradistinction to the fluid supply ordinarily employed in fountain-pens.

The improvement consists in simply preparing the solidified ink in the form of an adhesive paste, and applying it in suitable bulk to the inner concave portion of any ordinary pen at a point sufficiently above the slit in the nib as to prevent the same from interfering with the elasticity of the pen.

In the drawing, A represents a pen, and B the adhering mass of ink-paste placed in the concavity of the pen in suitable relation with respect to the point.

The inks which I prefer to use are those derived from tar products, which are mixed with any sufficiently adhesive substance, such as gum, honey, glucose, or glycerine, and applied to the pens, as shown, the glycerine serving to keep the paste moist, and thus preventing the cracking and peeling of the wet surface as it dries after being used.

I am aware of the fact that it is not new to apply to pens a solid ink adapted to render the pen self-supplying when dipped into water by a solution of the solid ink in the water, this idea being shown in the patent to L. B. Bertram, November 14, 1876. In this case, however, the solid ink, not being prepared with an adhesive substance, renders necessary a cartridge-shell for containing the ink, and a special form of pen to utilize the same.

I am aware, also, that a solid ink has been embodied for a similar use in the form of ink-paper, and that a solid ink has been applied to a pen formed of a series of parallel strips to hold it, the same being shown in English Patent No. 3,946 of 1873, but, as in the case before disclaimed, the absence of an adhesive substance renders necessary special means for holding the ink.

By using an adhesive substance, as described, to prevent the disintegration of the solid ink, and to secure its adhesion to the pen, it will be seen that I greatly improve the practical production of this class of pens, the concavity or curved sides of any of the common forms of pens being sufficient to hold the specially-prepared ink to its place until it is used up.

Having thus described my invention, what I claim as new is—

A pen having a plain open concavity, provided with a quantity of solidified ink prepared with an adhesive substance, substantially as described, and adapted to be partially dissolved to render the pen self-supplying by dipping in water, as set forth.

LÉON FARGUE.

Witnesses:
ROBT. M. HOOPER,
JEAN BAPTISTE ROLLAND.